US009902059B2

(12) United States Patent
Sonoda

(10) Patent No.: US 9,902,059 B2
(45) Date of Patent: Feb. 27, 2018

(54) ROBOT TEACHING APPARATUS, METHOD, AND ROBOT SYSTEM

(71) Applicant: CANON KABUSHIKI KAISHA, Tokyo (JP)

(72) Inventor: Tetsuri Sonoda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 14/827,924

(22) Filed: Aug. 17, 2015

(65) Prior Publication Data
US 2016/0059407 A1 Mar. 3, 2016

(30) Foreign Application Priority Data

Aug. 27, 2014 (JP) ................. 2014-173010
May 1, 2015 (JP) ................. 2015-094442

(51) Int. Cl.
B25J 9/00 (2006.01)
B25J 9/16 (2006.01)

(52) U.S. Cl.
CPC .............. B25J 9/0081 (2013.01); B25J 9/16 (2013.01); Y10S 901/04 (2013.01); Y10S 901/30 (2013.01)

(58) Field of Classification Search
CPC .......... B25J 9/0081; B25J 9/16; B25J 9/1612; G05B 19/42; G05B 19/421–19/423; Y10S 901/30; Y10S 901/04; Y10S 901/03; Y10S 901/31; Y10S 901/46; Y10S 901/47
USPC ........ 700/257, 258, 259, 260, 264; 901/3, 4, 901/30, 31, 46, 47
See application file for complete search history.

(56) References Cited

U.S. PATENT DOCUMENTS

| 6,212,443 | B1* | 4/2001 | Nagata | G05B 19/423 318/568.13 |
| 6,285,920 | B1* | 9/2001 | McGee | G05B 19/423 219/125.11 |
| 6,385,508 | B1* | 5/2002 | McGee | B25J 9/0081 285/189 |
| 8,368,521 | B2 | 2/2013 | Anabuki et al. | |
| 8,841,991 | B2 | 9/2014 | Anabuki et al. | |
| 9,082,185 | B2 | 7/2015 | Sonoda | |
| 2005/0222714 | A1* | 10/2005 | Nihei | G05B 19/423 700/264 |
| 2007/0239641 | A1* | 10/2007 | Ito | B25J 9/161 706/23 |
| 2009/0132088 | A1* | 5/2009 | Taitler | G05B 19/42 700/264 |
| 2009/0259412 | A1* | 10/2009 | Brogardh | B25J 9/1633 702/41 |
| 2011/0160910 | A1* | 6/2011 | Preisinger | B25J 13/06 700/275 |

(Continued)

FOREIGN PATENT DOCUMENTS

JP 2013-244560 A 12/2013

Primary Examiner — Bao Long T Nguyen
(74) Attorney, Agent, or Firm — Fitzpatrick, Cella, Harper & Scinto

(57) ABSTRACT

A robot teaching apparatus for teaching an operation of a robot measures a state of an action of a mechanism on a target object while the mechanism is acting on the target object. The mechanism has a shape or a function corresponding to a hand unit of the robot. The robot teaching apparatus generates an operation instruction for the robot based on the measured state, and records the generated operation instruction.

20 Claims, 11 Drawing Sheets

(56) References Cited

U.S. PATENT DOCUMENTS

| | | | | |
|---|---|---|---|---|
| 2011/0190932 A1* | 8/2011 | Tsusaka | ................... | B25J 13/08 |
| | | | | 700/254 |
| 2011/0208355 A1* | 8/2011 | Tsusaka | ................ | B25J 9/1664 |
| | | | | 700/246 |
| 2013/0054025 A1* | 2/2013 | Ito | ......................... | B25J 9/1697 |
| | | | | 700/246 |
| 2013/0204435 A1* | 8/2013 | Moon | .................... | G09B 19/00 |
| | | | | 700/258 |
| 2014/0350726 A1* | 11/2014 | Tsusaka | .................... | B25J 3/04 |
| | | | | 700/257 |
| 2015/0081098 A1* | 3/2015 | Kogan | .................. | B25J 9/1656 |
| | | | | 700/258 |
| 2015/0217445 A1* | 8/2015 | Hietmann | ............. | B25J 9/0081 |
| | | | | 700/264 |
| 2015/0290809 A1* | 10/2015 | Nakagawa | ............ | B25J 9/1676 |
| | | | | 700/258 |
| 2015/0323398 A1* | 11/2015 | Lauzier | ................. | B25J 9/0081 |
| | | | | 73/862.08 |
| 2016/0052128 A1* | 2/2016 | Zimmermann | ........ | B25J 9/0081 |
| | | | | 700/261 |

\* cited by examiner

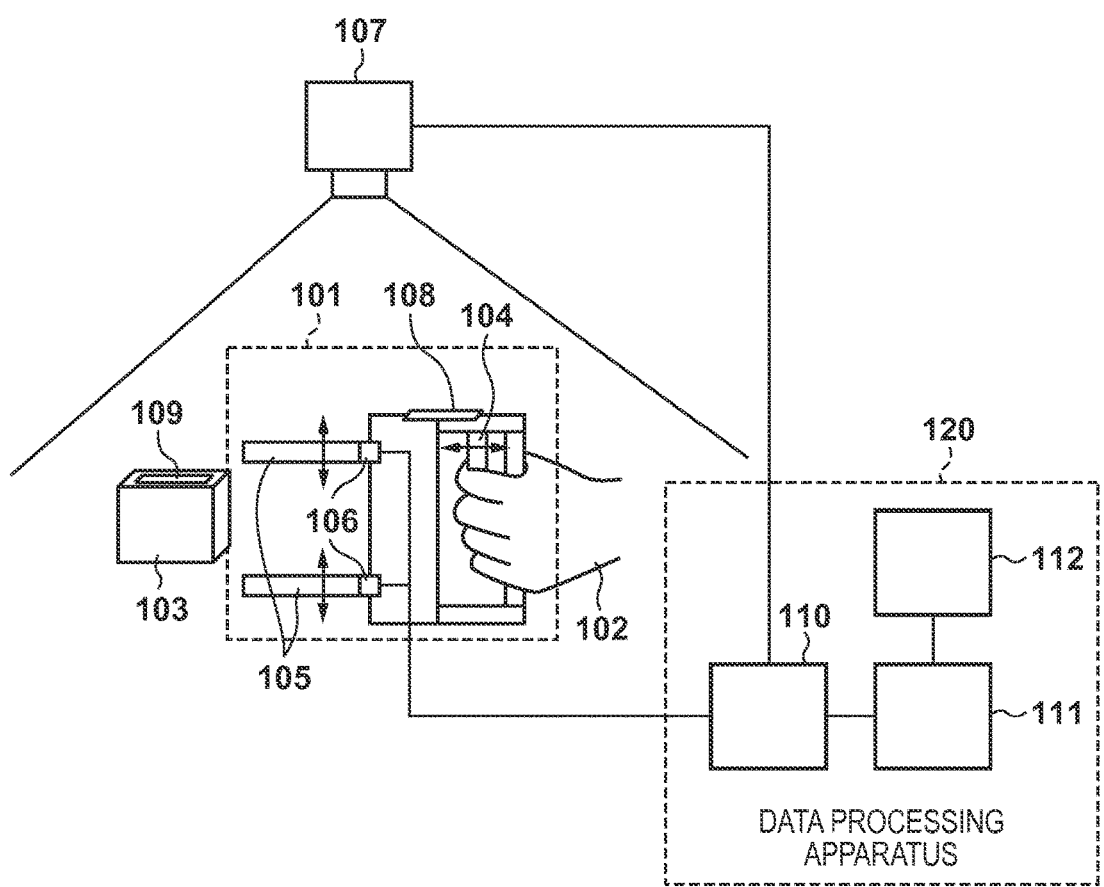
F I G. 1

F I G. 11A
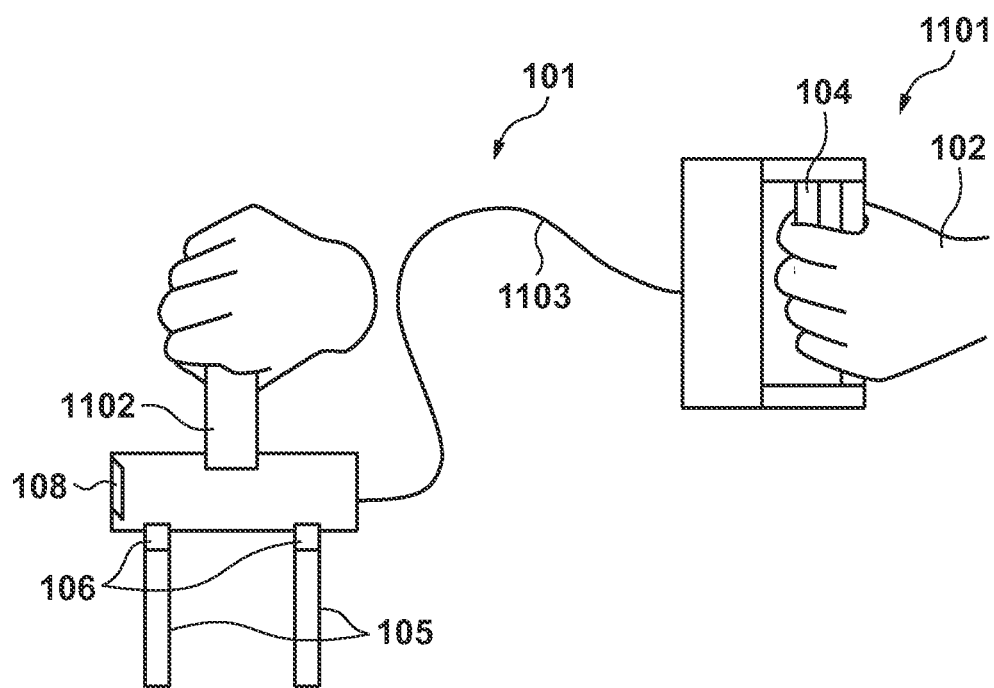
F I G. 11B
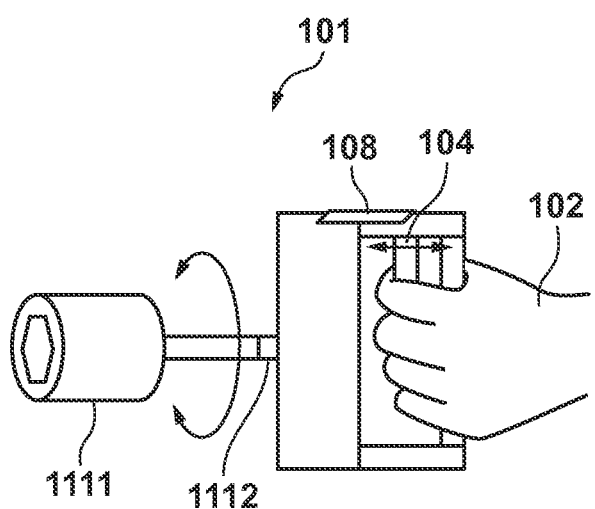

ROBOT TEACHING APPARATUS, METHOD, AND ROBOT SYSTEM

BACKGROUND OF THE INVENTION

Field of the Invention

The present invention relates to a robot teaching technique to program a robot to perform an operation.

Description of the Related Art

In recent years, the field of industrial robots has seen development of an offline teaching technique to teach an operation of a robot through reproduction of a mock robot and a mock surrounding environment thereof using a calculator. The offline teaching technique does not require robots operating in a factory to be used exclusively for the purpose of teaching, and is expected to contribute to the improvement in the production efficiency.

As an example of such an offline teaching technique, Japanese Patent Laid-Open No. 2013-244560 (hereinafter, Document 1) describes a method for designating a "specific position" on a target object as a move destination of a central portion of a robot hand and gripping the target object at the specific position. According to Document 1, the "specific position" can be designated while observing CAD data presented on a display of a calculator, and teaching can be performed without using an actual robot.

However, if a mock environment reproduced using a calculator differs from a real-world environment due to error in CAD data, reproducibility of calculation of mechanics, and the like, a problem arises in which an operation cannot be performed as calculated at a gripping position and with a gripping force that have been taught offline, that is to say, the teaching fails.

SUMMARY OF THE INVENTION

One embodiment of the present invention provides a robot teaching apparatus, a method, and a robot system for enabling teaching in a teaching environment that is in better harmony with a real-world environment, and reducing a failure in offline teaching.

According to one aspect of the present invention, there is provided a robot teaching apparatus for teaching an operation of a robot, the robot teaching apparatus comprising: a measuring unit configured to measure a state of an action of a mechanism on a target object while the mechanism is acting on the target object, the mechanism having a shape or a function corresponding to a hand unit of the robot; a generating unit configured to generate an operation instruction for the robot based on the state measured by the measuring unit; and a recording unit configured to record the operation instruction.

According to another aspect of the present invention, there is provided a control method for a robot teaching apparatus for teaching an operation of a robot, the control method comprising: measuring a state of an action of a mechanism on a target object while the mechanism is acting on the target object, the mechanism having a shape or a function corresponding to a hand unit of the robot; generating an operation instruction for the robot based on the measured state; and recording the generated operation instruction.

According to another aspect of the present invention, there is provided a robot system that operates in accordance with a taught operation, the robot system comprising: a robot teaching apparatus for teaching an operation of a robot, the robot teaching apparatus comprising: a measuring unit configured to measure a state of an action of a mechanism on a target object while the mechanism is acting on the target object, the mechanism having a shape or a function corresponding to a hand unit of the robot; a generating unit configured to generate an operation instruction for the robot based on the state measured by the measuring unit; and a recording unit configured to record the operation instruction; and a robot unit that operates based on the operation instruction accumulated in the recording unit.

According to another aspect of the present invention, there is provided a non-transitory computer readable storage medium storing a program for causing a computer to execute a control method for a robot teaching apparatus for teaching an operation of a robot, the control method comprising: measuring a state of an action of a mechanism on a target object while the mechanism is acting on the target object, the mechanism having a shape or a function corresponding to a hand unit of the robot; generating an operation instruction for the robot based on the measure state; and recording the generated operation instruction.

Further features of the present invention will become apparent from the following description of exemplary embodiments with reference to the attached drawings.

BRIEF DESCRIPTION OF THE DRAWINGS

FIG. 1 shows an example of a configuration of a robot teaching system according to a first embodiment.

FIGS. 10A, 10B, 11A, and 11B show other forms of a teaching hand.

DESCRIPTION OF THE EMBODIMENTS

Figure 2:
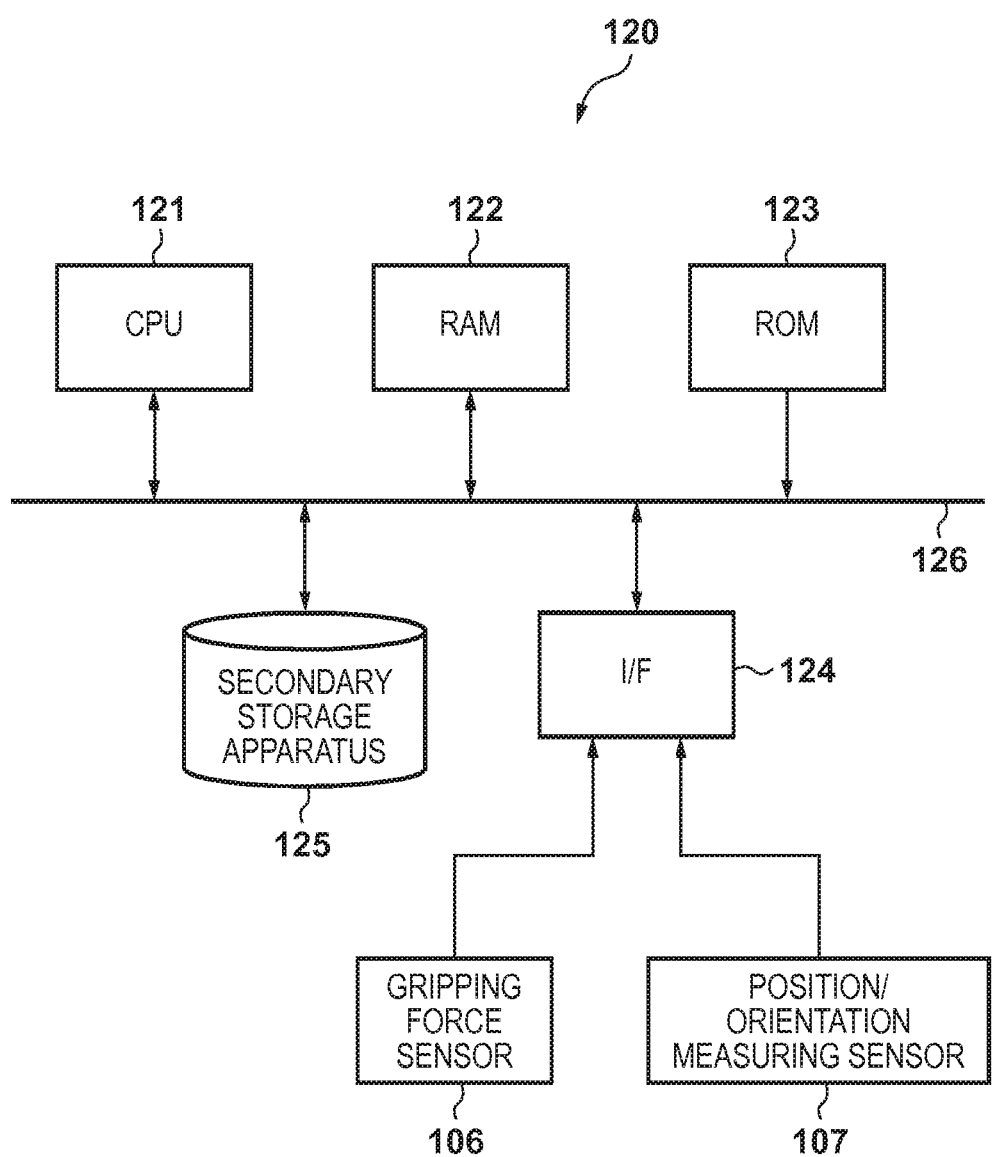
FIG. 2 shows an example of a configuration of a data processing apparatus according to the first embodiment.

The following describes some of preferred embodiments of the present invention with reference to the attached drawings. It should be noted that the following description presents, as an example, a robot teaching apparatus with which a teacher teaches a robot operation of holding a target object (e.g., a gripping position and a gripping force with respect to the target object) using a teaching hand.

In general offline robot teaching, teaching information is calculated in a mock environment reproduced using a calculator. However, this method is problematic in that, if the mock environment differs from a real-world environment, an operation cannot be performed as calculated, that is to say, teaching fails. The present embodiments enable teaching of an operation of a robot by performing an operation of gripping an actual target object using a teaching hand that has a shape and a holding function equivalent to a shape and a holding function of a robot hand actually used. In this way, an operation of a robot can be taught in a state where a real-world environment and a teaching environment are consistent with each other.

First Embodiment

FIG. 1 shows an overall configuration of a robot teaching apparatus for teaching an operation of a robot according to a first embodiment. The robot teaching apparatus according to the present embodiment teaches a robot operation of gripping a target object using a teaching hand 101 operated by a teacher. The robot teaching apparatus includes the teaching hand 101 that is operated directly by the teacher, and a data processing apparatus 120 that generates an operation instruction for a robot based on teaching information obtained from the teaching hand 101.

The teaching hand 101 has an action force input unit that inputs an action force applied through a teacher's action, and a mechanism that acts on the target object by being driven in accordance with the input action force. The mechanism according to the present embodiment performs a holding operation as an action on the target object. It should be noted that the mechanism of the teaching hand 101 acting on the target object has a shape corresponding to a hand unit attached to, for example, a tip of an arm of a robot serving as a teaching object. The teaching hand 101 functions as a teaching mechanism unit for teaching a robot operation. In the present embodiment, a robot operation is taught through an action in which the teacher grips the teaching hand 101 with his/her hand 102 so as to grip a target object 103. Although the present embodiment introduces the teaching hand 101 that can be gripped by the teacher as an example of a holding mechanism, the holding mechanism is not limited thereto. That is to say, the holding mechanism may be of any form as long as it can perform an operation of holding the target object and such a holding operation can be measured by a teaching measuring unit 110, which will be described later.

The teaching hand 101 has a holding mechanism that holds the target object by being driven in accordance with an action force input by the teacher. The teaching hand 101 includes a trigger 104 that is positioned at a gripping portion gripped by the teacher and functions as an action force input unit for inputting an action force of the teacher, and fingers 105 that function as a holding unit for gripping the target object. The trigger 104 and the fingers 105 inter-connectedly operate in a mechanical manner due to an inter-connected operation mechanism, which is not shown; for example, a force that pulls the trigger 104 rightward in the figure is converted into a force that causes the two fingers 105 to pinch the object. With such an inter-connected operation mechanism, the amount at which the fingers 105 close changes in accordance with the amount at which the trigger 104 is pulled, and a gripping force of the fingers 105 changes in accordance with a pulling force. It should be noted that the fingers 105 used here are the same as or equivalent to fingers used by the robot serving as the teaching object. A gripping force sensor 106 outputs a gripping force with which the fingers 105 grip the target object 103. This gripping force sensor 106 is composed of, for example, resistance elements attached to a base of the fingers 105 that can be considered elastic; when the fingers 105 exert a gripping force, minute distortion occurs, that is to say, the resistance elements extend, and resistance values thereof change accordingly. The gripping force can be measured by applying voltage to the resistance elements and measuring a change in the resistance values thereof.

A position/orientation measuring sensor 107 measures the positions and orientations of the teaching hand 101 and the target object 103. The position/orientation measuring sensor 107 is composed of, for example, a CCD camera, and captures an image of rectangular measurement markers 108 and 109 that are attached to the teaching hand 101 and the target object 103, respectively. In the captured image, the measurement markers 108 and 109 appear skewed in a trapezoidal shape depending on the orientations, that is to say, tilts of the teaching hand 101 and the target object 103. In the present embodiment, the teaching measuring unit 110 measures the positions and orientations of the measurement markers 108 and 109, and of the teaching hand 101 and the target object 103 on which the markers are fixed in place, based on the tilts and sizes of the markers in the captured image.

In the data processing apparatus 120, the teaching measuring unit 110 measures a holding operation performed by of the holding mechanism of the teaching hand 101 with respect to the target object 103. For example, the teaching measuring unit 110 measures a gripping force of the fingers 105 and the positions and orientations of the teaching hand 101 and the target object 103 at a predetermined timing using the gripping force sensor 106 and the position/orientation measuring sensor 107, and records the measurement result. An operation calculating unit 111 calculates an operation instruction for the robot based on the holding operation measured by the teaching measuring unit 110. More specifically, for example, with the use of the gripping force of the fingers 105 and the positions and orientations of the teaching hand 101 and the target object 103 recorded by the teaching measuring unit 110, the operation calculating unit 111 calculates an operation instruction of which the actual robot will be notified. An operation recording unit 112 records and accumulates operation instructions calculated by the operation calculating unit 111 into a memory. The recorded operation instructions can be read and used as necessary.

The data processing apparatus 120 can be realized by, for example, a computer apparatus. FIG. 2 is a block diagram showing an example of a hardware configuration of the data processing apparatus 120. In FIG. 2, a CPU 121 realizes various types of processing by executing programs stored in a RAM 122 or a ROM 123. The RAM 122, which is a readable and writable random-access memory, is used as a working area when the CPU 121 executes various types of processing. The ROM 123, which is a read-only memory, retains programs executed by the CPU 121 and various types of data. An interface 124 brings the aforementioned gripping force sensor 106 and position/orientation measuring sensor 107 into connection with the data processing apparatus 120. A secondary storage apparatus 125, such as a hard disk, stores programs that are executed after being deployed to the RAM 122, and various types of data (e.g., the operation instructions calculated by the operation calculating unit 111). The secondary storage apparatus 125 also provides a recording area into which the operation recording unit 112 records the operation instructions. The foregoing constituents are all connected to a bus 126.

It should be noted that the teaching measuring unit 110, the operation calculating unit 111, and the operation recording unit 112 of the data processing apparatus 120 can each be realized by the CPU 121 executing a program retained in the ROM 123 or the RAM 122.

Figure 3:
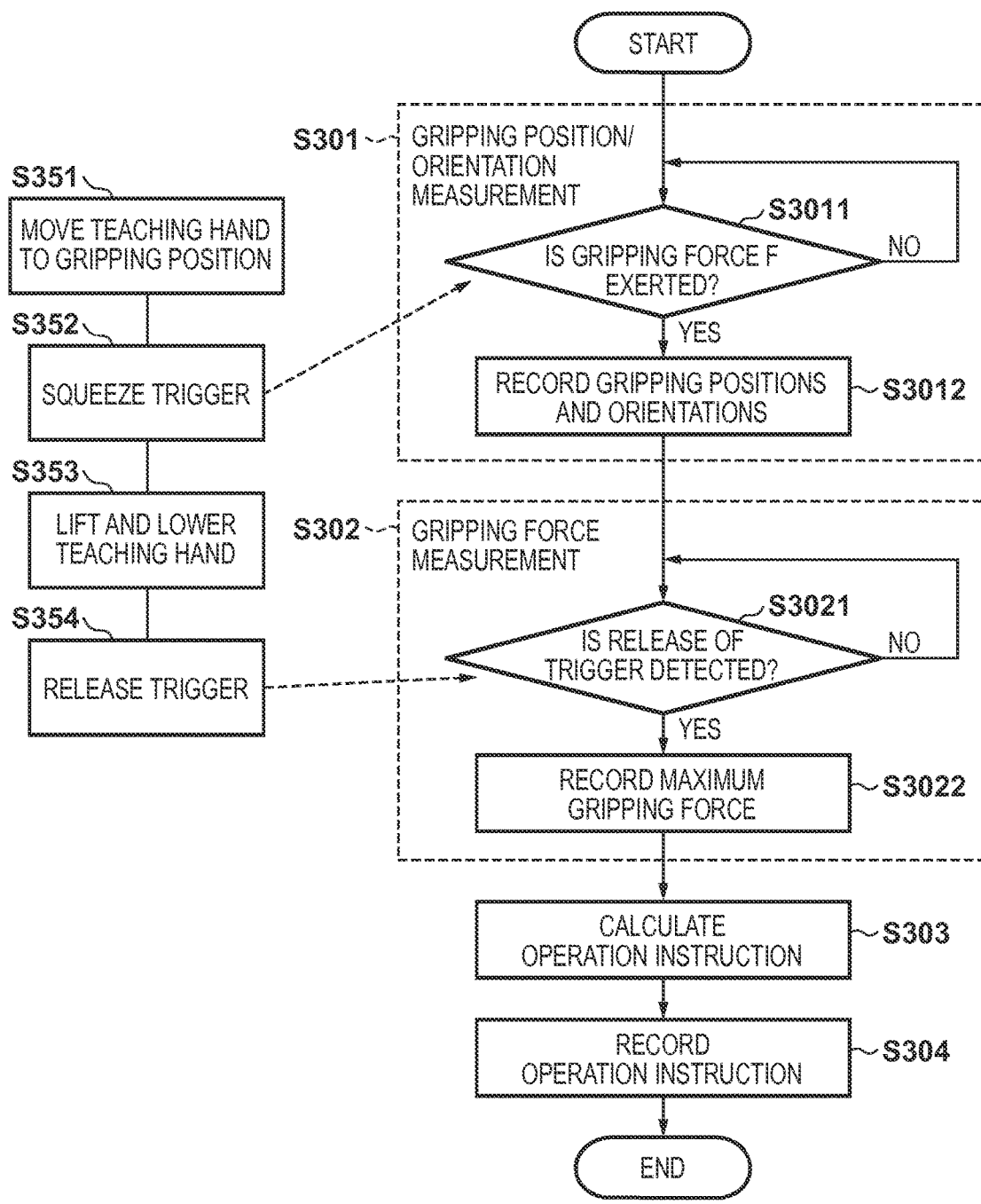
FIG. 3 is a flowchart illustrating operations according to the first embodiment.

A description is now given of operations of the robot teaching apparatus according to the present embodiment configured in the above-described manner. FIG. 3 is a flowchart illustrating an action in which the teacher teaches a robot operation of gripping the target object using the teaching hand (steps S351 to S354), and operations of the robot teaching apparatus (steps S301 to S304). In the flowchart of FIG. 3, operations of steps S3011 and S3012 represent gripping position/orientation measurement in which the position and orientation of the teaching hand 101 gripping the target object are measured (step S301). On the other hand, operations of steps S3021 and S3022 represent gripping force measurement in which a gripping force exerted by the fingers 105 on the target object 103 is measured (step S302). The operations will be described below in line with the steps in the flowchart.

While gripping the teaching hand 101, the teacher moves the same to a gripping position for the target object 103 (step S351), and squeezes the trigger 104 of the teaching hand 101 (step S352). Consequently, an action force of the teacher is input to the teaching hand 101, and the fingers 105 move in a closing direction (a pinching direction of the two fingers 105) through their inter-connected operation with the trigger 104. It should be noted that, as a spring is built in the trigger 104, the trigger 104 returns to the original position upon release of squeezing of the trigger 104, which causes the fingers 105 to move in an opening direction through the inter-connected operation.

The teaching measuring unit 110 measures a gripping force exerted by the fingers 105 based on a signal from the gripping force sensor 106, and in step S3011, it determines whether the fingers 105 are exerting a gripping force based on a measured gripping force F. If the fingers 105 are exerting the gripping force (F≠0), the teaching measuring unit 110 determines that the target object 103 is being gripped, and proceeds to step S3012. If the fingers 105 are not exerting the gripping force (F=0), it is determined that the target object 103 is not being gripped, and the process of step S3011 is repeated (that is to say, exertion of the gripping force F is waited for).

In step S3012, the teaching measuring unit 110 measures the positions and orientations of the teaching hand 101 and the target object 103 using the position/orientation measuring sensor 107, and records them into, for example, the RAM 122. In this way, the positions and orientations of the teaching hand 101 and the target object 103 are measured when the gripping force is exerted. In measurement of the positions and orientations, the position/orientation measuring sensor 107 captures an image of the measurement markers 108 and 109 that are attached to the teaching hand 101 and the target object 103, respectively. Based on the appearances of the measurement markers in the captured image, the teaching measuring unit 110 obtains triaxial translational positions and triaxial rotational orientations with the position/orientation measuring sensor 107 serving as the origin. The position and orientation of the teaching hand, $P_h$, and the position and orientation of the target object, $P_o$, are each expressed by a 4×4 Affine matrix obtained by combining a rotation matrix $R_h$ or $R_o$ with a translation vector $T_h$ or $T_o$ as indicated by the following expression (1).

$$\begin{cases} P_h = (R_h T_h) = \begin{pmatrix} R_{hxx} & R_{hyx} & R_{hzx} & T_{hx} \\ R_{hxy} & R_{hyy} & R_{hzy} & T_{hy} \\ R_{hxz} & R_{hyz} & R_{hzz} & T_{hz} \\ 1 & 1 & 1 & 1 \end{pmatrix} \\ P_o = (R_o T_o) = \begin{pmatrix} R_{oxx} & R_{oyx} & R_{ozx} & T_{ox} \\ R_{oxy} & R_{oyy} & R_{ozy} & T_{oy} \\ R_{oxz} & R_{oyz} & R_{ozz} & T_{oz} \\ 1 & 1 & 1 & 1 \end{pmatrix} \end{cases} \quad (1)$$

This achieves measurement of the positions and orientations of the teaching hand 101 and the target object 103 when the teaching hand 101 is gripping the target object 103.

Next, the teacher moves the teaching hand 101 while gripping the target object 103 (step S353). For example, the teacher performs an operation of lifting the target object 103 gripped by the teaching hand 101, and then lowering and placing the target object 103. During this operation (e.g., an operation from the lifting action to the lowering action), the teacher exerts the gripping force F on the target object 103 by squeezing the trigger 104 with a sufficient action force that is necessary to prevent the target object 103 from falling off the teaching hand 101, and to prevent a shift in the gripping position.

When the teacher releases the trigger 104 of the teaching hand 101 by loosening the force applied to the trigger 104, the fingers 105 of the teaching hand 101 no longer exert the gripping force on the target object 103, and the fingers 105 release the target object 103 (step S354). In response to this action, the teaching measuring unit 110 detects the release of the trigger 104 (e.g., the gripping force F=0) based on a signal from the gripping force sensor 106 in step S3021. The teaching measuring unit 110 continues to measure the gripping force after it is determined that the gripping force is exerted. In step S3022, the teaching measuring unit 110 records a maximum gripping force $F_{max}$, which is a maximum value of gripping forces that were measured during a time period from detection of the exertion of the gripping force F to detection of the release of the trigger 104, into the RAM 122 for example.

Next, in step S303, the operation calculating unit 111 calculates an operation instruction for the robot based on the gripping positions and orientations recorded in step S3012 and on the maximum gripping force recorded in step S3022. For example, the operation instruction is composed of an instructional position and orientation $P_c$ and an instructional gripping force $F_c$ for gripping the target object 103. In order to cope with a variety of positions and orientations of the target object 103, the instructional position and orientation $P_c$ are described using relative coordinates with the target object 103 serving as a reference, as indicated by the following expression (2).

$$P_c = P_h^{-1} \cdot P_o \quad (2)$$

An operational position and orientation of a robot hand, $P_a$, for operating the robot serving as the teaching object are calculated using the instructional position and orientation $P_c$ in accordance with the following expression (3). That is to say, provided that the position and orientation of the target object detected in a robot coordinate system during an operation of the robot are $P_{oa}$, the following holds.

$$P_a = P_{oa} \cdot P_c^{-1} \quad (3)$$

Here, as the position and orientation of the target object, $P_{oa}$, are dynamic values detected during the operation of the robot, it is sufficient to calculate $P_a$ based on $P_c$ immediately before each operation.

In the present embodiment, the maximum gripping force $F_{max}$ recorded in step S3022 is directly used as the instructional gripping force $F_c$ as indicated by the following expression (4).

$$F_c = F_{max} \quad (4)$$

In step S304, the operation recording unit 112 records the operation instruction calculated in step S303, that is to say, the instructional position and orientation $P_c$ and the instructional gripping force $F_c$ into the secondary storage apparatus 125 for example. The recorded operation instruction can be read and used as appropriate during an actual robot operation. Also, operation instructions can be recorded and accumulated sequentially through multiple executions of a teaching operation.

As described above, execution of the procedures according to the present embodiment enables teaching of a robot operation through an operation in which the teacher grips the actual target object using the teaching hand that has a gripping function equivalent to a gripping function of the robot hand. In this way, teaching can be performed while keeping consistency with a real-world robot environment without emergence of a problem of differences from a mock environment created through a simulation.

Second Embodiment

A description is now given of a specific embodiment of a robot teaching apparatus using a teaching hand that is formed differently from the teaching hand according to the first embodiment.

In the first embodiment, the trigger 104 and the fingers 105 of the teaching hand 101 shown in FIG. 1 have mechanisms that inter-connectedly operate in a mechanical manner, and an action force of a teacher serves directly as a gripping force of the fingers 105. Meanwhile, in the second embodiment, the action force of the teacher is replaced with alternative power to deal with a fragile target object that breaks with a normal gripping force of a human, so as to enable teaching of a robot operation by gripping such a target object with an appropriate gripping force.

Figure 4:
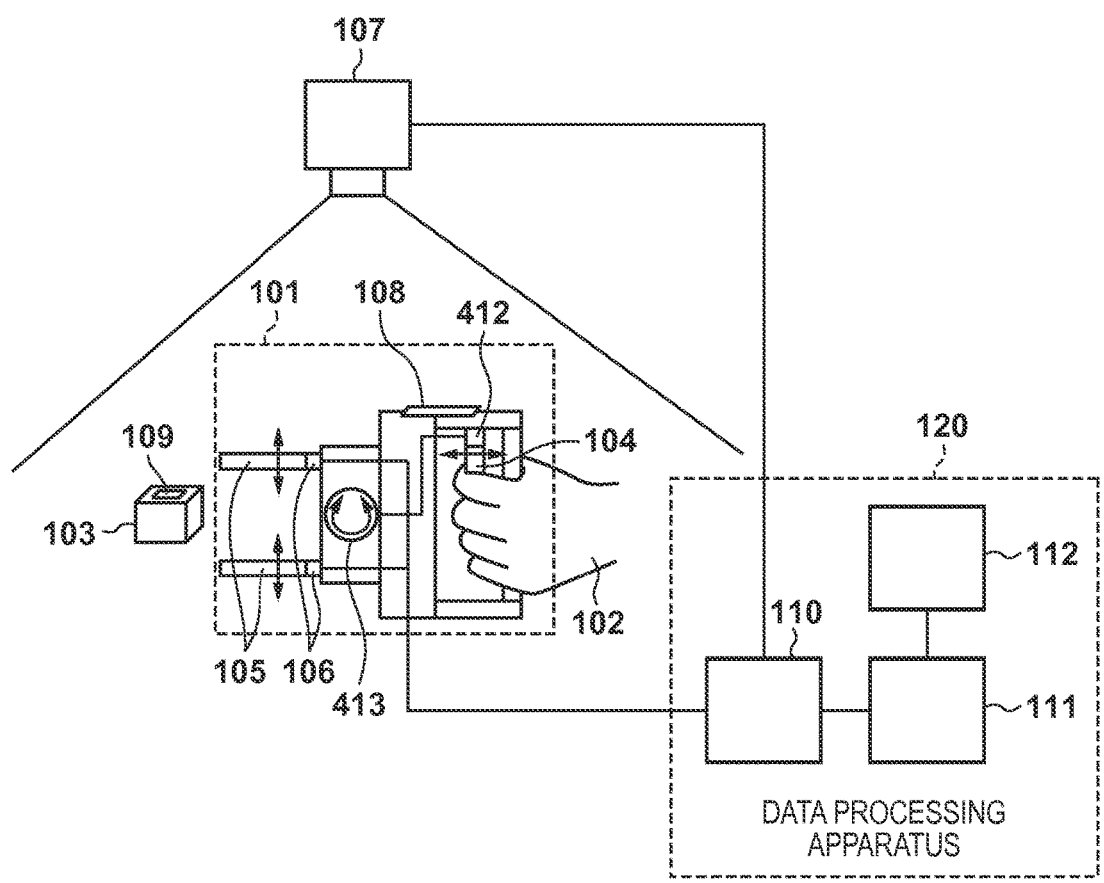
FIG. 4 shows an example of a configuration of a robot teaching system according to a second embodiment.

FIG. 4 shows an example of a configuration of the robot teaching apparatus according to the second embodiment. FIG. 4 shows an overall configuration of the robot teaching apparatus with which a teacher teaches a robot operation of gripping a target object 103 using a teaching hand 101. The target object 103, a measurement marker 109, a gripping force sensor 106 and a measurement marker 108 of the teaching hand 101, a position/orientation measuring sensor 107, a teaching measuring unit 110, an operation calculating unit 111, and an operation recording unit 112 shown in FIG. 4 are similar to their counterparts described in the first embodiment (FIG. 1).

It is assumed that the target object 103 according to the second embodiment is relatively small and fragile, and a gripping force that can be tolerated thereby is small. Furthermore, a squeezing force sensor 412 is provided at the root of a trigger 104 installed in the teaching hand 101 so as to measure an action force exerted by the teacher squeezing the trigger 104 with his/her hand 102. Based on the action force measured by the squeezing force sensor 412, a motor 413 switches between normal rotation and reverse rotation, and changes a rotation torque. Fingers 105 open and close through their inter-connected operation with rotation of the motor 413. This mechanism switches between the opening action and the closing action of the fingers 105 in accordance with rotation of the motor 413, and changes the gripping force of the fingers 105 in accordance with a rotation torque of the motor 413.

Figure 5:
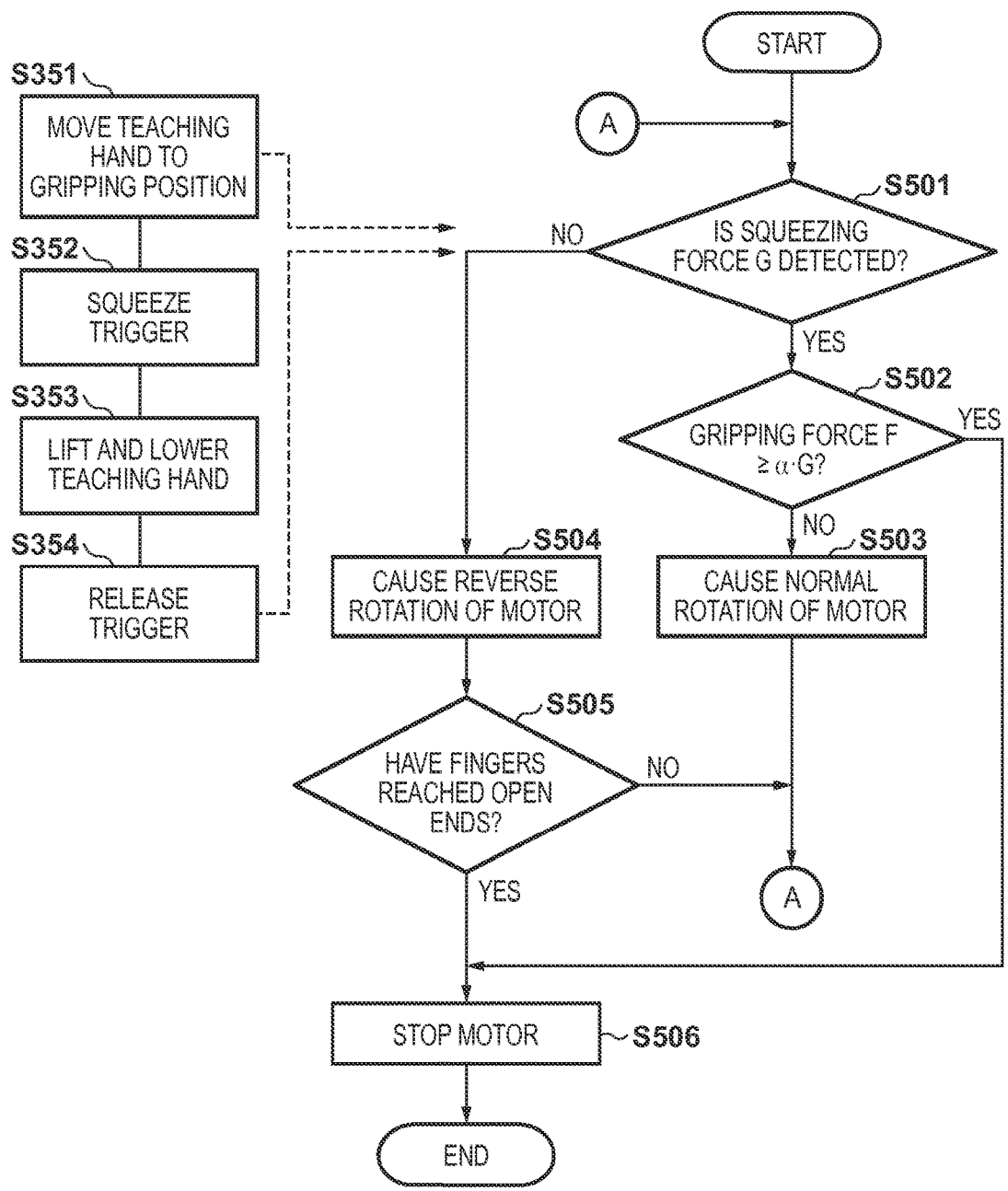
FIG. 5 is a flowchart illustrating operations according to the second embodiment.

FIG. 5 is a flowchart illustrating operations performed by the teaching hand 101 when the teacher grips the target object 103 using the teaching hand 101 in the second embodiment. It should be noted that operations of a data processing apparatus 120 according to the second embodiment are similar to the operations of steps S301 to S304 according to the first embodiment (FIG. 3). In the flowchart of FIG. 5, steps S351 to S354 represent operations of the teacher, whereas steps S501 to S506 represent operations of the teaching hand 101.

While gripping the teaching hand 101, the teacher moves the same to a gripping position for the target object 103 (step S351). The procedure of the present step is similar to its counterpart according to the first embodiment. Next, the teacher tightly squeezes the trigger 104 of the teaching hand 101 with his/her hand 102 (step S352). Then, in step S501, the teaching hand 101 detects an action force (squeezing force G) exerted on the trigger 104 using the squeezing force sensor 412.

Upon detection of the squeezing force G, the teaching hand 101 causes the motor 413 to rotate in a normal rotation direction. When the motor 413 rotates in the normal rotation direction, the fingers 105 inter-connectedly operate and move in a closing direction. The motor 413 rotates in the normal rotation direction upon exertion of the squeezing force G, and a maximum allowable driving torque is controlled so that the fingers 105 exert a gripping force F of up to an allowable gripping force $F_{limit}$ indicated by the following expression (5). The gripping force F is detected by the gripping force sensor 106.

$$F_{limit} = \alpha \cdot G \quad (5)$$

Here, $\alpha$ is a parameter that takes an arbitrary value, and is equal to 0.1 in the present embodiment. This makes it possible to facilitate gentle gripping of the target object 103 that breaks with a normal gripping force of a human. To explain the foregoing operations in line with the flowchart of FIG. 5, the teaching hand 101 that has detected the squeezing force G determines whether the gripping force F is greater than or equal to $F_{limit}$ based on a signal from the gripping force sensor 106 in step S502. If the gripping force F is not greater than or equal to $F_{limit}$, the teaching hand 101 causes the motor 413 to rotate in the normal rotation direction in step S503 so as to make the fingers 105 close. On the other hand, if it is determined in step S502 that the gripping force F is greater than or equal to $F_{limit}$, the motor 413 is stopped. It should be noted that the squeezing force G becomes zero when the teacher releases the trigger 104. If the squeezing force G is zero in step S501, the teaching hand 101 causes the motor 413 to rotate in a reverse rotation direction (step S504) so as to make the fingers 105 move in an opening direction. If the fingers 105 have reached open ends (step S505), the teaching hand 101 stops the reverse rotation of the motor 413 (step S506).

The data processing apparatus 120, which receives a signal related to the foregoing holding operation from the teaching hand 101, executes the operations of steps S301 to S304 shown in FIG. 3. That is to say, in step S3011, the teaching measuring unit 110 determines whether a gripping force is exerted by measuring the gripping force F based on a signal from the gripping force sensor 106. If the gripping force is exerted (F·0), it is determined that the target object 103 is being gripped, and processing proceeds to step S3012. If the gripping force F is zero, it is determined that the target object is not being gripped, and step S3011 is repeated.

In step S3012, the position/orientation measuring sensor 107 measures the positions and orientations of the teaching hand 101 and the target object 103. In step S3012, the teaching measuring unit 110 obtains the position and orientation of the teaching hand 101, $P_h$, and the position and orientation of the target object, $P_o$. In this way, the positions and orientations of the teaching hand 101 and the target object 103 are measured when the gripping force is exerted, and the measurement result is recorded into, for example, a RAM 122.

In step S353, the teacher lifts and lowers the target object 103 by moving the teaching hand 101 gripping the target object 103. Thereafter, in step S354, the teacher stops squeezing the trigger 104 of the teaching hand 101 by loosening the force applied by his/her hand 102.

Once the teacher has thus stopped the squeezing action, the squeezing force sensor 412 of the teaching hand 101 detects a zero action force G (NO of step S501). As stated earlier, upon detection of a zero action force G, the motor 413 rotates in the reverse rotation direction in step S504, and the fingers 105 accordingly move in the opening direction. When the fingers 105 are placed in a maximum open state (have reached the open ends), the rotation stops. When the teaching measuring unit 110 detects release of the trigger through the foregoing action by the teacher (step S3021), it records a maximum value $F_{max}$ of gripping forces F that were measured while the gripping force sensor 106 was sensing exertion thereof (YES of step S3011 to YES of step S3021).

Similarly to the first embodiment, the operation calculating unit 111 calculates an operation instruction for a robot in step S303. That is to say, the operation calculating unit 111 obtains an instructional position and orientation $P_c$ and an instructional gripping force $F_c$. Then, in step S304, the operation recording unit 112 records the operation instruction calculated in step S303, that is to say, the instructional position and orientation $P_c$ and the instructional gripping force $F_c$ (into, for example, the RAM).

As described above, the second embodiment enables teaching of a robot operation through an operation in which the teacher grips the actual target object 103 using the teaching hand 101 that has a gripping function equivalent to a gripping function of a robot hand while appropriately adjusting a gripping force thereof. In this way, teaching can be performed while keeping consistency with a real-world robot environment without emergence of a problem of differences from a mock environment created through simulation, even in the case of a fragile target object.

Third Embodiment

A third embodiment introduces a robot teaching apparatus that calculates an operation instruction in accordance with a teaching operation and evaluates the calculated operation instruction based on an environment in which teaching was performed and the teaching operation. In the third embodiment, a configuration for obtaining an operation evaluation value is provided in addition to the configuration according to the first embodiment. An operation evaluation value is obtained by evaluating a teaching operation based on, for example, a gripping force exerted on a target object, the magnitude of a rotational moment applied to a wrist portion of a teaching hand, and changes in the relative gripping positions and orientations of the teaching hand and the target object at the time of gripping the target object. In this way, in a case where a robot performs an actual gripping operation in accordance with an operation instruction selected from among a plurality of similar operation instructions, an operation instruction associated with a more preferable operation evaluation value is selected so as to achieve a more reliable gripping operation.

Figure 6:
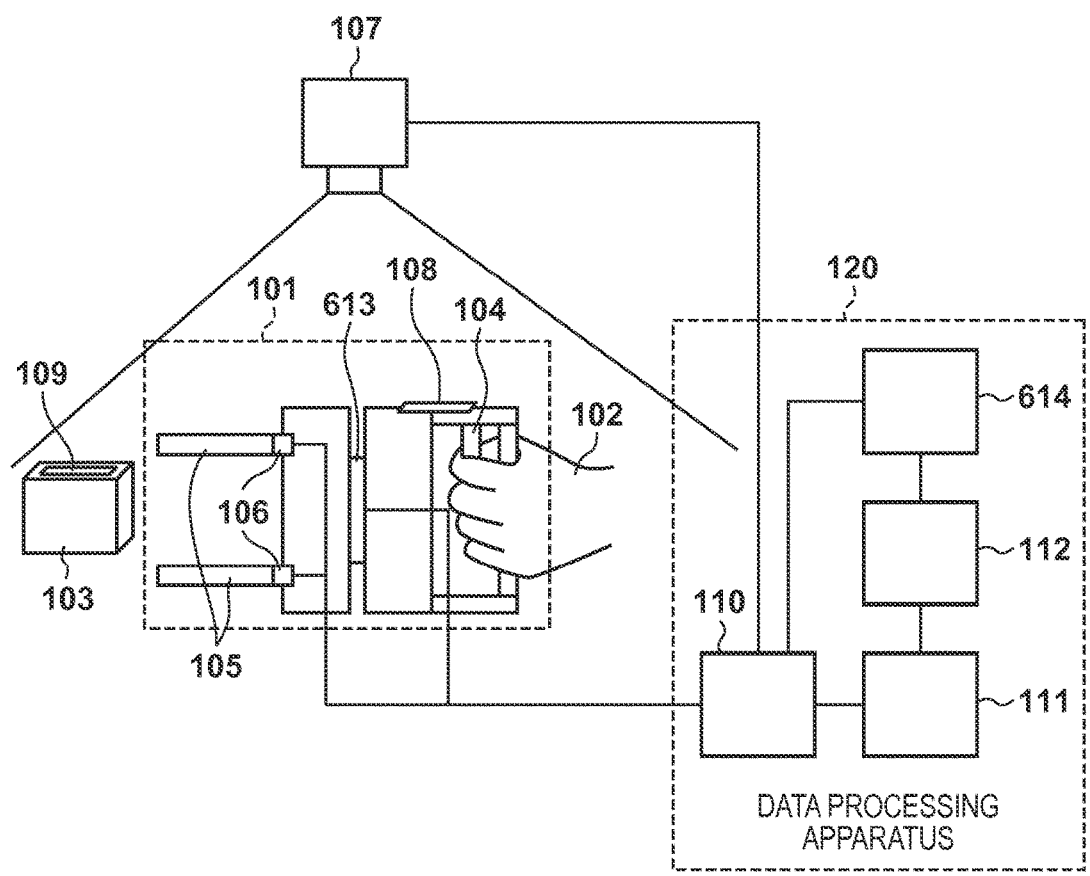
FIG. 6 shows an example of a configuration of a robot teaching system according to a third embodiment.

FIG. 6 shows an overall configuration of a robot teaching apparatus according to the third embodiment. The following describes an example in which, similarly to the first embodiment, a robot operation performed by a robot for gripping a target object is taught by a teacher actually gripping a target object 103 using a teaching hand 101. The target object 103, a measurement marker 109, a trigger 104, fingers 105, a gripping force sensor 106, a measurement marker 108, a position/orientation measuring sensor 107, a teaching measuring unit 110, an operation calculating unit 111, and an operation recording unit 112 shown in FIG. 6 are configured similarly to their counterparts described in the first embodiment (FIG. 1).

The teaching hand 101 according to the third embodiment includes a wrist force sensor 613. The wrist force sensor 613 is arranged in a portion equivalent to a wrist of the teaching hand 101, and measures a triaxial rotational moment exerted in a direction of a rotational axis of the wrist. A data processing apparatus 120 according to the third embodiment includes an operation evaluating unit 614. The operation evaluating unit 614 obtains an operation evaluation value indicating the quality of a teaching operation using a maximum gripping force and a maximum rotational moment recorded by the teaching measuring unit 110, as well as changes in the gripping positions and orientations of the teaching hand 101 and the target object 103 while gripping the target object.

Figure 7:
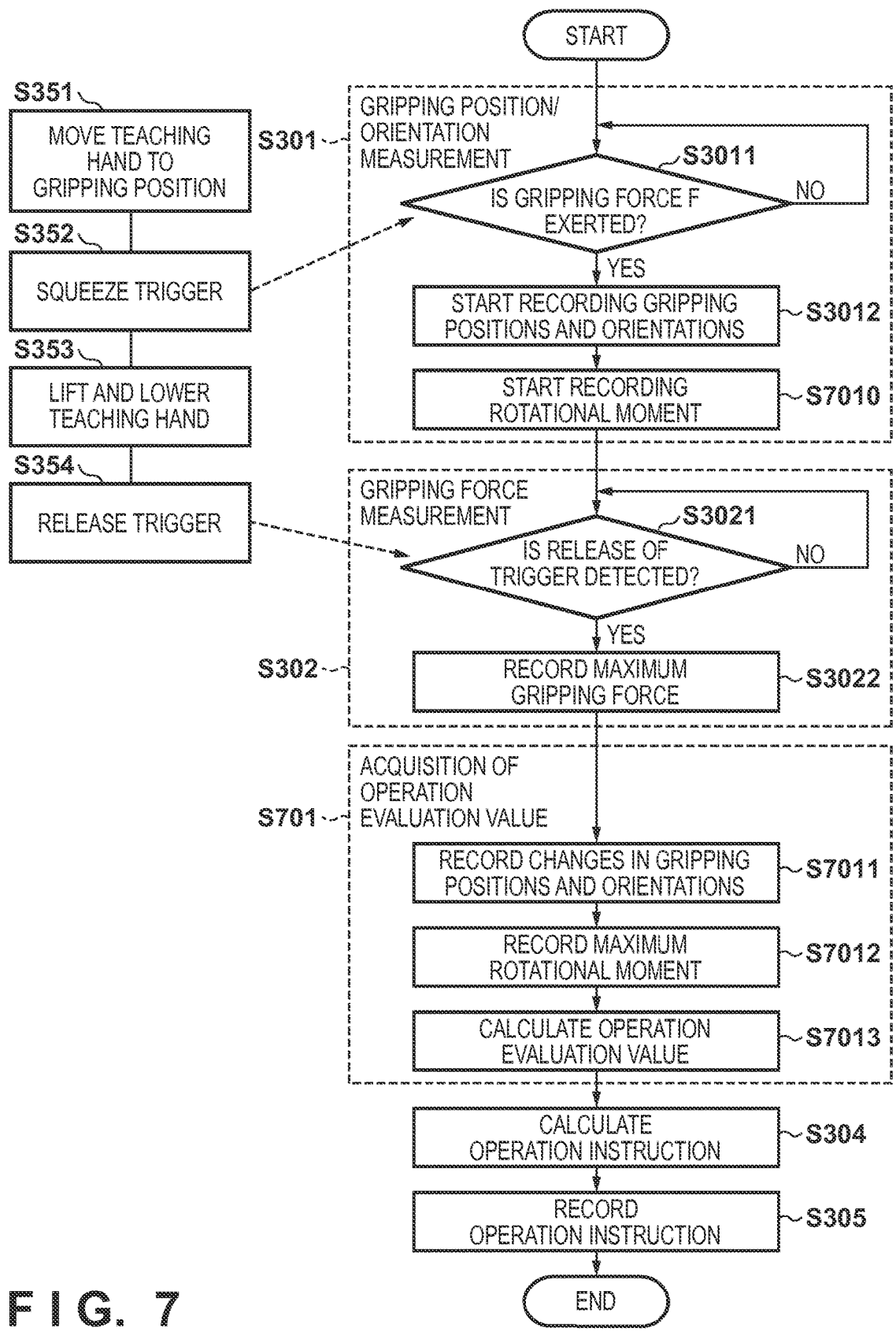
FIG. 7 is a flowchart illustrating operations according to the third embodiment.

FIG. 7 is a flowchart illustrating processing for teaching a robot operation according to the third embodiment. The flowchart of FIG. 7 illustrates a sequence of procedures in which an operation evaluation value is obtained by the teacher teaching a robot operation of gripping the target object using the teaching hand. In the flowchart of FIG. 7, steps S3011, S3012, and S7010 represent measurement of the gripping position and orientation of the target object (step S301), steps S3021 and S3022 represent measurement of a gripping force exerted on the target object (step S302), and steps S7011 to S7013 represent acquisition of an operation evaluation value (step S701). The following description will be given in line with the steps in the flowchart.

Processes of steps S301 and S302 are substantially similar to those according to the first embodiment. However, from step S3012 until release of the trigger (until the determination in step S3021 results in YES), measurement and recording of the positions and orientations of the teaching hand 101 and the target object 103 are continued. In step S7010, the teaching measuring unit 110 starts measurement and recording of a rotational moment based on a signal from the wrist force sensor 613. Measurement and recording of the rotational moment are continued until release of the trigger is detected (until the determination in step S3021 results in YES), similarly to measurement and recording of the gripping positions and orientations.

In step S701, an operation evaluation value is acquired. First, in step S7011, the operation evaluating unit 614 reads, from a memory, the positions and orientations of the teaching hand 101 and the target object 103 immediately before detection of release of the trigger in step S3021, which were measured using the position/orientation measuring sensor 107. Then, the operation evaluating unit 614 calculates and records changes from the positions and orientations (the relative positions and orientations of the teaching hand 101 and the target object 103) acquired immediately after detection of exertion of the gripping force (step S3012). In this way, changes (that is to say, shifts) in the relative positions and orientations of the target object 103 and the teaching hand 101 (fingers 105) between the start and the end of gripping is calculated and recorded. It should be noted that the positions and orientations are measured in step S3012 using the measurement markers 108 and 109, similarly to the first embodiment. In step S7011, the operation evaluating unit 614 obtains a positional change $T_d$ and an orientational change $R_d$ of the teaching hand 101 and the target object 103 using the position and orientation of the teaching hand upon exertion of the gripping force F, $P_h$ and $P_o$, as well as the position and orientation of the teaching hand upon release of the trigger, $P_{h2}$ and $P_{o2}$. They are expressed by the following expression (6).

$$\begin{cases} T_d = T_{o2} - T_o \\ R_d = \begin{pmatrix} r_{dx} \\ r_{dy} \\ r_{dz} \end{pmatrix} \end{cases} \quad (6)$$

Here, $R_d$ is a vector expressed on the basis of the rotational axis, and given the expression (7), the expression (8) holds.

$$\begin{cases} \theta_d = |R_d| \\ I = \begin{pmatrix} 1 & 0 & 0 \\ 0 & 1 & 0 \\ 0 & 0 & 1 \end{pmatrix} \\ S = I + \frac{\sin\theta_d}{\theta_d} R_d + \frac{1-\cos\theta_d}{\theta_d^2} R_d^2 \end{cases} \quad (7)$$

$$S = (R_{o2}^{-1} \cdot R_{h2})^{-1}(R_o^{-1} \cdot R_h) \quad (8)$$

Next, in step S7012, the operation evaluating unit 614 records a maximum value of rotational moments that were measured by the wrist force sensor 613 while the target object 103 was gripped (from YES of step S3011 to YES of step S3021). The maximum value of rotational moments, that is to say, a maximum rotational moment $M_{max}$ is expressed by the following expression (9) as a triaxial vector in the rotational direction at a wrist position.

$$M_{max} = \begin{pmatrix} m_{xmax} \\ m_{ymax} \\ m_{zmax} \end{pmatrix} \quad (9)$$

In step S7013, the operation evaluating unit 614 calculates an operation evaluation value $E_c$ indicating the quality of a teaching operation. The operation evaluation value $E_c$ is calculated in accordance with the following expression (10) using the following items acquired in steps S7011 and S7012: the maximum gripping force $F_{max}$, the maximum rotational moment $M_{max}$, and the changes in the gripping positions and orientations of the teaching hand 101 and the target object 103 while gripping the target object 103, $R_d$ and $T_d$.

$$E_c = \beta \cdot F_{max}^2 + \gamma \cdot |M_{max}|^2 + \lambda \cdot |R_d|^2 + \epsilon \cdot |T_d|^2 \quad (10)$$

Here, $\beta$, $\gamma$, $\lambda$, and $\epsilon$ are parameters that each take an arbitrary value and represent a weight for a corresponding term. With the above expression, the operation evaluation value $E_c$ is calculated based on the following factors.

1. It is desirable that the maximum gripping force be as small as possible in consideration of consumption of electric power and a rotation torque required for a motor.

Figure 8A:
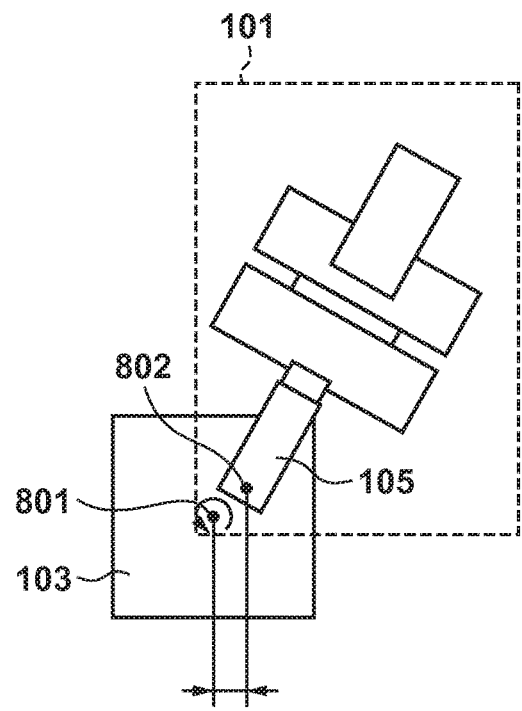
FIG. 8A shows a state in which a teaching hand is gripping a target object at a position close to a barycentric position of the target object.
Figure 8B:
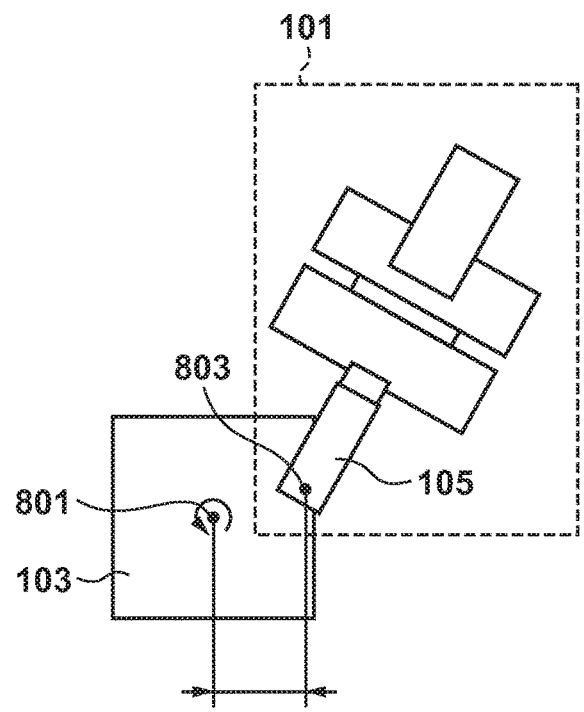
FIG. 8B shows a state in which the teaching hand is gripping the target object at a position far from the barycentric position of the target object.

2. FIGS. 8A and 8B show the teaching hand 101 and the target object 103 as observed from the side. As shown in these figures, a rotational moment is larger when the target object 103 is gripped at a position 803 far from a barycentric position 801 thereof (FIG. 8B) than when the target object 103 is gripped at a position 802 close to the barycentric position 801 thereof (FIG. 8A). In order to minimize the possibility of a gripping shift attributed to such a rotational moment, it is desirable that the maximum rotational moment be as small as possible.

3. Changes in the gripping positions and orientations represent gripping shifts; in order to minimize the possibility of falling of the target object, it is desirable that such changes be as small as possible.

In view of the above, it is preferable that the operation evaluation value $E_c$ be as small as possible (a smaller operation evaluation value $E_c$ is more preferable).

In step S304, the operation calculating unit 111 obtains an operation instruction for the robot, that is to say, an instructional position and orientation $P_c$ and an instructional gripping force $F_c$, in a procedure similar to the procedure according to the first embodiment. Then, in step S305, the operation recording unit 112 records the operation instruction calculated in step S304, that is to say, the instructional position and orientation $P_c$ and the instructional gripping force $F_c$, in one-to-one association with the operation evaluation value $E_c$ acquired in step S701 (S7013).

With the above-described configuration of the third embodiment, in a situation where a plurality of operation instructions related to similar gripping orientations have been taught, an operation instruction to be used can be selected by evaluating the plurality of operation instructions based on their respective operation evaluation values $E_c$. That is to say, the operation evaluation values $E_c$ can be used as indexes for selecting the optimal operation instruction from among the plurality of operation instructions.

As described above, execution of the procedures according to the third embodiment enables teaching of a robot operation through an operation in which the teacher grips the actual target object using the teaching hand that has a gripping function equivalent to a gripping function of a robot hand. Furthermore, in a case where the robot performs an actual gripping operation in accordance with an operation instruction selected from among a plurality of similar operation instructions, an operation instruction having the smallest operation evaluation value among candidate operation instructions is selected so as to achieve a reliable gripping operation while minimizing the possibility of a shift or falling of the target object. Moreover, operation instructions and operation evaluation values are accumulated by teaching an operation multiple times, and a preferable operation instruction is extracted from among the accumulated operation instructions; accordingly, an actual robot operation can be performed in a more optimal manner.

Other Embodiments

A description is now given of main modification examples that are applicable to the above-described embodiments.

Example: Use of Equivalent Fingers and Target Object

Although the fingers 105 of the teaching hand 101 and the target object 103 used in the first to third embodiments are respectively the same as a hand unit (e.g., fingers) and a target object used in an operation of a robot serving as a teaching object, no limitation is intended in this regard. Mock fingers and a mock target object may be alternatively used, provided that their functions, such as shapes, weights, hardnesses, and surface frictions, can be treated as the equivalents. For example, they can be generated using a 3D printer, in which case the actual fingers and target object used by the actual robot are unnecessary.

(Other Forms of Teaching Hand)

Although the teaching hand according to the first to third embodiments is formed such that the action force input unit, which inputs an action force through a teacher's action, is arranged adjacent to the fingers, the teaching hand is not limited to being formed in this way. Any teaching hand may be used as long as it can be held by an operator and it has a function of inputting an action force.

Figure 10A:
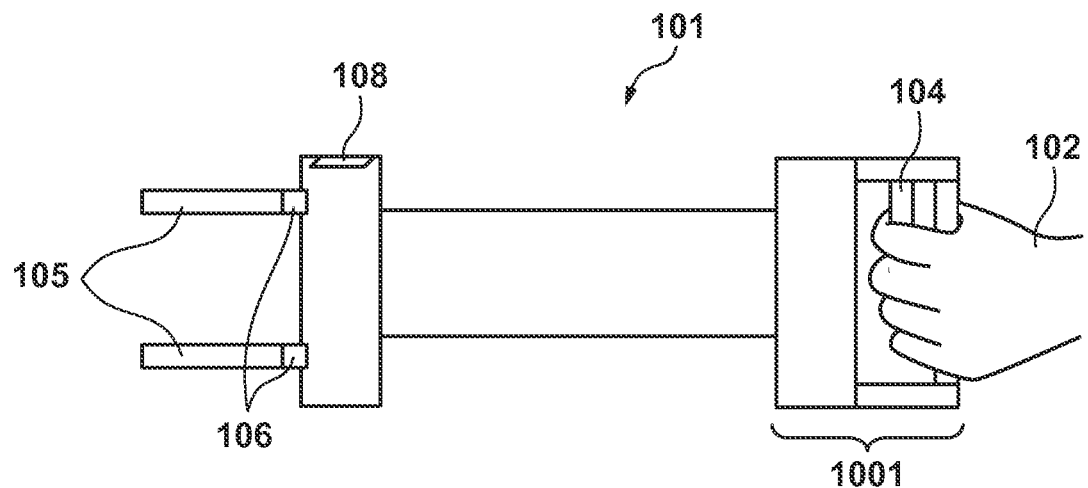
Figure 10B:
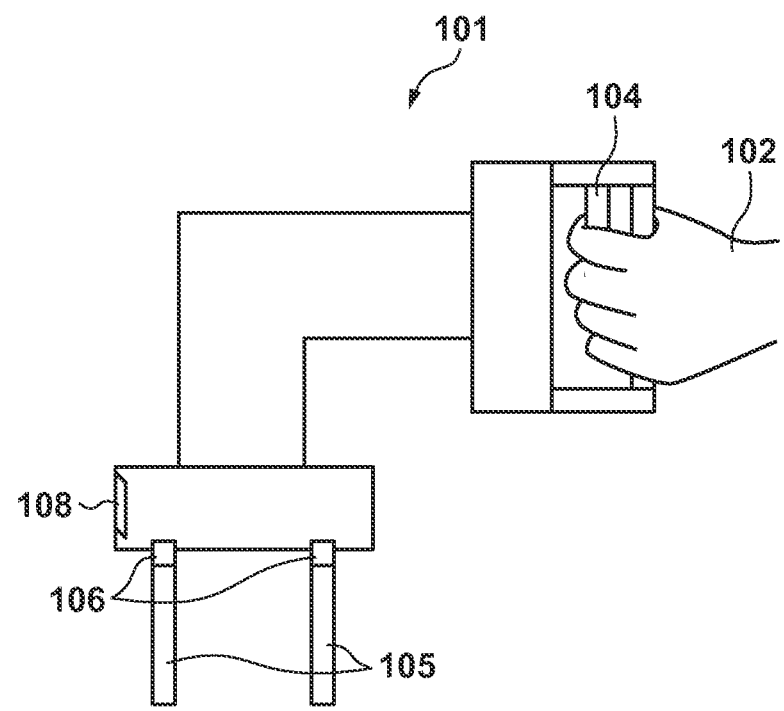

FIGS. 10A, 10B, and 11A show examples of a teaching hand that is intended to be used in complex places where insertion of a human hand is difficult. In FIG. 10A, an action force input unit 1001 and fingers 105 are distanced from each other so as to grip a target object located in a position that is difficult to reach by a human hand. In FIG. 10B, an action force input unit 1001 and fingers 105 are arranged facing different directions under the assumption that the positions in which a human hand can be inserted are limited due to, for example, obstacles and a target object is present in a different direction. In FIG. 11A, an action force input unit 1101 operated by a teacher is separated from fingers 105 operated in a work environment under the assumption that more precise maneuvering is performed. An action force input by the teacher through the action force input unit 1101 (an action force exerted on a trigger 104) is transmitted to the fingers 105 via a wire 1103. This wire 1103 is configured similarly to a wire that transmits a brake force in a bicycle.

It should be noted that, in the case of the teaching hand according to the second embodiment, this wire is replaced with a conductive wire or a wireless transmission/reception apparatus that converts the action force into voltage, a resistance value, or an electric signal based on PWM and the like and transmits the conversion result. Furthermore, a handle 1102 is additionally attached to a base of the fingers 105 so as to allow the teacher to hold the separately-arranged fingers 105.

Any action force input unit may be used as long as it can sufficiently input an action force while being held by the teacher. For example, the entirety of a grip portion of the teaching hand gripped by the teacher may be configured as a trigger, in which case an action force is input in accordance with grip strength. This enables input of an action force of a higher magnitude.

Example: Use of Other Sensors

Although the gripping force sensor 106 according to the first to third embodiments is composed of the resistance elements, no limitation is intended in this regard. For example, a gripping force may be measured by arranging two electrodes in parallel to each other such that the two electrodes are perpendicular to a base of the fingers 105 that can be considered elastic, supplying an alternating current, and measuring a change in the capacitance between the electrodes caused by minute distortion. This can minimize portions that are directly deformed and prolong the life of the gripping force sensor.

Although the position/orientation measuring sensor 107 according to the first to third embodiments captures an image of the measurement markers 108 and 109 using the CCD camera, no limitation is intended in this regard. For example, a source coil that generates a magnetic field may be arranged in a position corresponding to the CCD camera, and sensor coils that measure the magnetic field may be arranged in positions corresponding to the measurement markers. The positions and orientations of the sensor coils relative to the source coil can be measured by causing the source coil to generate a magnetic field that changes in a time-division manner and causing the sensor coils to detect a change in the magnetic field. In this way, the positions and orientations can be measured even in a situation where the CCD camera and the measurement markers are blocked by a human body or other obstacles.

(Plotting Coordinate Axes)

As in step S303, the operation calculating unit 111 according to the first to third embodiments calculates, as an operation instruction for a robot, the instructional position and orientation $P_c$ in a coordinate system in which the target object 103 serves as a reference; however, no limitation is intended in this regard. For example, the position and orientation of the teaching hand, $P_h$, may be used as-is when it is guaranteed that the target object is always placed in the same position. In this case, it is sufficient to perform coordinate transformation appropriately so that the coordinate system in which the position and orientation of the teaching hand, $P_h$, are measured and the coordinate system of a robot serving as a teaching object are identical or can be treated identically.

(Include Orientation of Target Component as Output)

When a robot performs a gripping operation, the orientation in which a target object is placed also greatly influences whether the gripping operation succeeds or fails; therefore, a rotation matrix $R_o$ of the target object may be included in an output operation instruction. A failure in a gripping operation can be further reduced by referring to the rotation matrix $R_o$ indicating the orientation of the target object and selecting an operation instruction that most resembles the measured orientation of the target object in an actual operation of the robot.

(Hand Driven with Ratchet)

Although the teaching hand 101 according to the first and third embodiments has an opening and closing mechanism as the trigger 104 and the fingers 105 inter-connectedly operate in a mechanical manner, no limitation is intended in this regard. For example, a ratchet mechanism may be added to stay in a position where the maximum action force exerted on the trigger 104 is maintained until a release operation is performed using a button and the like. In this way, a teacher can easily continue a gripping operation without maintaining application of a squeezing force. At this time, a trigger release operation by a user (step S354) is replaced with the foregoing release operation using a button and the like.

Furthermore, the teaching hand 101 according to the second embodiment may be similarly configured such that the maximum action force sensed by the squeezing force sensor is maintained in relation to the gripping force of the fingers 105 until a release operation is performed using a button. In this way, a teacher can experience a similar effect, that is to say, easily continue a gripping operation without maintaining application of a squeezing force. At this time, a trigger release operation by the teacher (step S354) is replaced with the foregoing release operation using a button and the like.

(Action Force Input Unit Other than Trigger)

Although the trigger 104 of the teaching hand 101 serves as the action force input unit in the second embodiment, no limitation is intended in this regard. Any action force input unit may be used as long as it can input an action force as a value, one example being a volume-adjustable action force input unit that need not be tightly squeezed by the teacher. This allows for sustained input of an action force without the teacher feeling tired from exertion of a squeezing force.

(Suction Hand)

Although the teaching hand 101 according to the second embodiment grips a target object by opening and closing the fingers 105, no limitation is intended in this regard. For example, a holding mechanism may be used that has a function other than a gripping function, such as a function of holding a target object by adhesion using a suction hand that changes its suction force in accordance with an action force of the teacher. This enables teaching of various types of holding operations that utilize a holding force other than a gripping force (e.g., a suction force).

(Other Non-Holding Hands)

Although the above-described embodiments have introduced a configuration for gripping a target object by opening and closing the fingers 105 as a mechanism of the teaching hand 101 that acts on the target object, the mechanism that acts on the target object is not limited to a holding operation including such a gripping operation. For example, as shown in FIG. 11B, such a mechanism may encompass a wrench 1111 or a driver that exerts a rotation force and changes a fastening torque in accordance with an action force of the teacher. A torque sensor 1112 is attached to a base of the wrench 1111, which enables teaching of an operation of fastening a screw, such as a bolt, with a predetermined torque as with a torque wrench. With the use of this teaching hand, an operation instruction for a robot can be obtained by acquiring, as an action state, the position and orientation of the teaching hand based on the measurement marker 108 as well as a rotation force exerted on the target object from the torque sensor 1112, similarly to the above-described embodiments.

(Adaptive Change in Force)

The teaching hand 101 according to the second embodiment is intended for a fragile target object that breaks with a normal gripping force of a human, and a in step S502 is smaller than one; however, no limitation is intended in this regard, and a may be greater than one. In the case of a target object that slips with a normal gripping force of the teacher, setting a to be greater than one enables teaching of an operation by gripping the target object with a more powerful gripping force without any shift. In this case, it is preferable to replace the motor 413 with an element that can output a more powerful rotation torque.

Furthermore, although a in step S502 is a fixed value, it may change, for example, in a non-linear manner in consideration of ranges of perception characteristics and gripping forces of humans. For example, exponentially changing a gripping force enables fine control of a gripping force when a small gripping force is required, and enables output of a powerful gripping force from an action force that can be maintained by the teacher with ease when a large gripping force is required.

(Application to Attachment of Component Using Force Sensor)

Although the wrist force sensor 613 according to the third embodiment measures a triaxial rotational moment exerted in the direction of the rotational axis of the wrist and uses the measurement result in calculation of an operation evaluation value, no limitation is intended in this regard. Other than the rotational moment, for example, a triaxial translational force may be measured. By thus measuring a triaxial force exerted in a direction of a translational axis of the wrist, an operation can be taught in relation to an action other than a gripping operation. This enables, for example, teaching of a working process of gripping a target component and fitting the gripped target component while adjusting a force applied to a specific region. In this case, it is sufficient to record a maximum translational force $S_{max}$, similarly to the procedure for recording the maximum rotational moment $M_{max}$ in step S7012, and reflect it in calculation of the operation evaluation value $E_c$ in step S7013.

(Combination with Simulation)

Although the operation evaluating unit 614 according to the third embodiment obtains an operation evaluation value based on a maximum gripping force, a maximum rotational moment, and changes in the gripping positions and orientations, no limitation is intended in this regard. A mock robot and a mock surrounding environment thereof may be reproduced using a calculator and combined with offline teaching for teaching an operation of a robot. For example, teaching of an operation can be evaluated based on a difference between a set of a maximum gripping force, a maximum rotational moment, and changes in the gripping positions and orientations obtained in a mock teaching operation reproduced through calculation in offline teaching, and a set of those obtained in a teaching operation in an environment according to the third embodiment. When numeric values of one set are extremely different from numeric values of the other set, it is presumed that one of a simulated environment and a teaching environment has a problem, and low evaluation is given. In this way, an operation evaluation value is calculated in consideration of consistency with the simulated environment, and an operation of a robot can be taught with higher reliability and less failures.

Example Including Robot System

Figure 9:
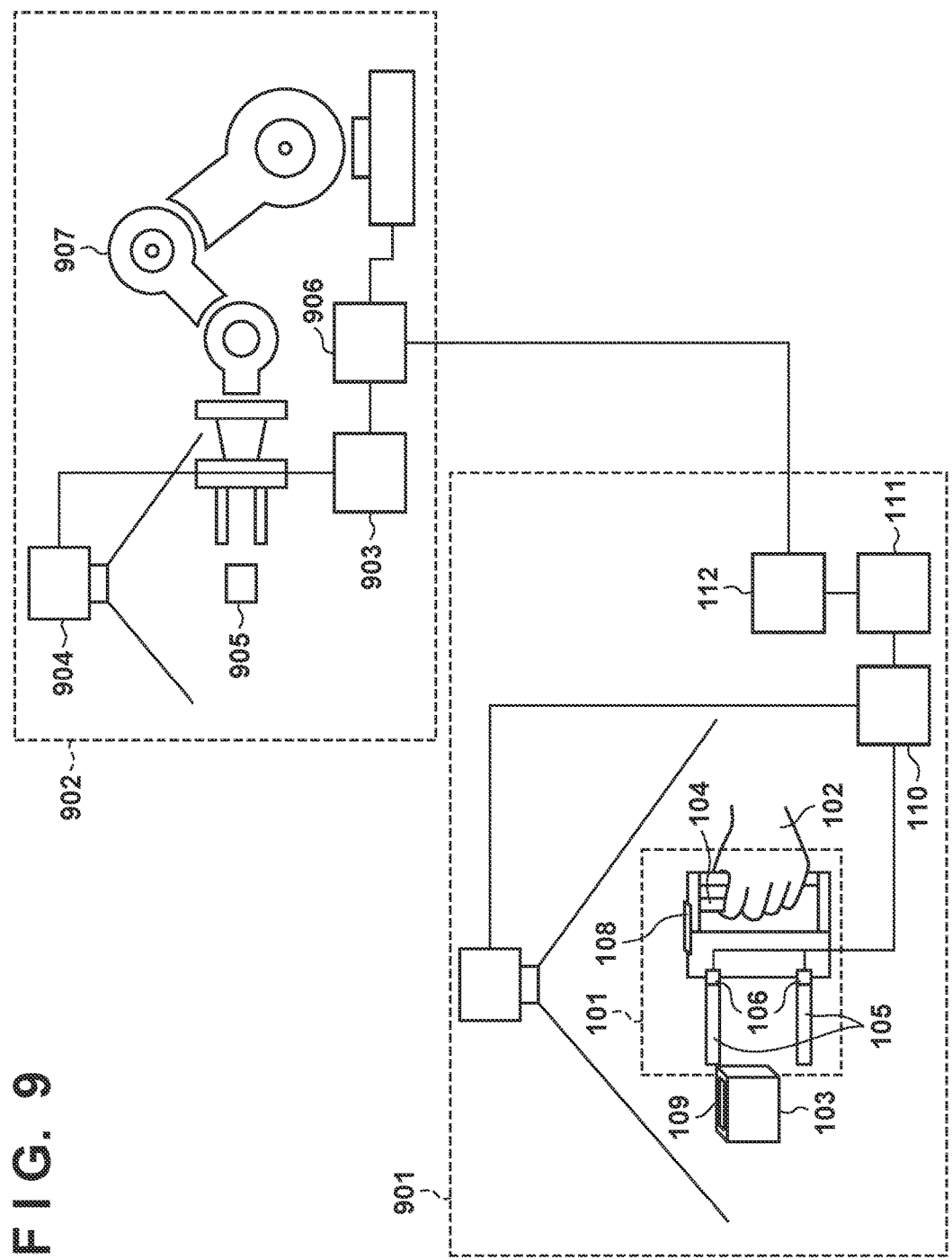
FIG. 9 shows a robot system.

The first to third embodiments have introduced a configuration in which a calculated operation instruction is recorded into the operation recording unit, and the operation instruction is read from the operation recording unit for use in an operation of a robot serving as a teaching object; however, no limitation is intended in this regard. For example, as shown in FIG. 9, one robot system may be constructed that includes a robot teaching unit 901 composed of the constituents according to the first embodiment, and a robot unit 902 serving as a teaching object. In this case, after an operation instruction is recorded into the operation recording unit 112 in procedures similar to the procedures according to the first embodiment, the robot unit 902 operates as follows.

An environment measuring unit 903 of the robot unit 902 identifies the position and orientation of a target object 905, $P_{oa}$, using a position/orientation measuring sensor 904. An operation generation unit 906 calculates the operation position and orientation $P_a$ shown in step S303 of the first embodiment. A robot arm 907 grips the target object 905 by operating an arm in accordance with a target position, that is to say, the operation position and orientation $P_a$. In this configuration, a robot serving as a teaching object performs an actual operation immediately after the teacher teaches an operation; this enables more prompt and accurate teaching. Furthermore, comparison between teaching of an operation and an actual operation of a robot serving as a teaching object makes it easy to determine whether teaching of the operation is appropriate. Teaching of the operation may be ended if it is appropriate, and may be performed again if there is any problem. In this way, an operation can be taught in a more reliable manner. Furthermore, the teacher may grade the appropriateness of teaching of an operation and reflect the result in an operation evaluation value calculated by the operation evaluating unit. In this way, teaching of an operation can be evaluated while taking into consideration a subjective intent of the teacher in addition to an operation evaluation value, which is calculated based only on particular parameters, and hence teaching can be performed in better harmony with the intention of the teacher.

Example: Outputting Result of Teaching to Another Information Processing Apparatus The first to third embodiments have introduced a configuration in which a calculated operation instruction is recorded into the operation recording unit, and the operation instruction is read from the operation recording unit for use in an operation of a robot serving as a teaching object; however, no limitation is intended in this regard. For example, the calculated operation instruction may be output to another information processing apparatus connected via a wired or wireless network, and this information processing apparatus may store the result of the operation.

Example: Realization Using Computer

The data processing apparatus 120 according to the first to third embodiments (e.g., the teaching measuring unit 110, the operation calculating unit 111, the operation recording unit 112, and the operation evaluating unit 614) may be realized by supplying a system or an apparatus with a storage medium storing program codes of software that realizes the functions thereof. An object of the present invention is achieved also by a computer (or a CPU or an MPU) of the system or the apparatus reading and executing the program codes stored in the storage medium. In this case, the program codes read from the storage medium themselves realize the functions of the above-described embodiments, and the storage medium storing the program codes constitutes the present invention.

Examples of the storage medium for supplying the program codes include a flexible disk, a hard disk, an optical disc, a magneto-optical disc, a CD-ROM, a CD-R, a magnetic tape, a non-volatile memory card, a ROM, and a DVD.

Furthermore, the functions of the above-described embodiments are realized by executing the program codes read by the computer. There is also a case in which an operating system (OS) and the like running on the computer realize the functions of the above-described embodiments by executing a part or all of actual processing based on instructions of the program codes.

Moreover, the program codes read from the storage medium are written to a memory provided in a function expansion board inserted in the computer or a function expansion unit connected to the computer. There is also a case in which a CPU and the like of the function expansion board or the function expansion unit realize the functions of the above-described embodiments by executing a part or all of actual processing based on instructions of the program codes.

Advantageous Effects of Embodiments

The first embodiment enables teaching of a robot operation through an operation in which the teacher grips the actual target object using the teaching hand that has a gripping function equivalent to a gripping function of the robot hand. In this way, teaching can be performed while keeping consistency with a real-world robot environment without emergence of a problem of differences from a mock environment created through a simulation.

The second embodiment enables teaching of a robot operation through an operation in which the teacher grips the actual target object using the teaching hand that has a gripping function equivalent to a gripping function of a robot hand while appropriately adjusting a gripping force. In this way, teaching can be performed while keeping consistency with a real-world robot environment without emergence of a problem of differences from a mock environment created through simulation, even in the case of a fragile target object.

The third embodiment enables teaching of a robot operation through an operation in which the teacher grips the actual target object using the teaching hand that has a gripping function equivalent to a gripping function of the robot hand. Furthermore, in a case where a robot performs an actual gripping operation in accordance with an operation instruction selected from among a plurality of similar operation instructions, an operation instruction having the smallest operation evaluation value among candidate operation instructions is selected so as to achieve a reliable gripping operation while minimizing the possibility of a shift or falling of the target object. Moreover, operation instructions and operation evaluation values are accumulated by teaching an operation multiple times in accordance with the present embodiment, and only a preferable operation instruction is extracted from among the accumulated operation instructions; accordingly, an actual robot operation can be performed in a more optimal manner.

The above-described embodiments enable teaching in a teaching environment that is consistent with a real-world environment.

It should be noted that the teaching mechanism unit of the present invention may be configured in any way as long as it can hold a target object and teach an operation. One example is the teaching hand according to the first embodiment. Although the teaching hand according to the first embodiment holds the target object by gripping the target object with the fingers, the target object may be held with the use of a suction hand instead.

The teaching measuring unit of the present invention may be configured in any way as long as it can measure teaching of an operation. One example is the teaching measuring unit according to the first embodiment that performs measurement using the gripping force sensor and the position/orientation measuring sensor.

The operation calculating unit of the present invention may be configured in any way as long as it can calculate an operation instruction for a robot. One example is the operation calculating unit according to the first embodiment. The above-described teaching measuring unit, operation calculating unit, and operation evaluating unit may be realized by supplying a system or an apparatus with a storage medium storing program codes of software that realizes the functions thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-173010 filed Aug. 27, 2014 and 2015-094442 filed May 1, 2015, which are hereby incorporated by reference herein in their entirety.

What is claimed is:

1. A robot teaching apparatus for teaching an operation of a robot, the robot teaching apparatus comprising:
   a measuring unit configured to measure a holding force exerted in a state where a holding unit of a mechanism is holding a target object, the mechanism having a shape or a function corresponding to a hand unit of the robot; and
   a generating unit configured to generate an operation instruction for the robot based on the holding force measured by the measuring unit.

2. The robot teaching apparatus according to claim 1, wherein the mechanism is driven by a force applied to an action force input unit as the mechanism and the action force input unit inter-connectedly operate in a mechanical manner, the action force input unit being used by a teacher to input an action force.

3. The robot teaching apparatus according to claim 1, wherein the mechanism is driven by an electric signal corresponding to an action force input by a teacher.

4. The robot teaching apparatus according to claim 1, wherein the holding unit is configured to hold the target object by gripping or suctioning the target object.

5. The robot teaching apparatus according to claim 1, wherein the holding unit maintains the holding force based on a maximum action force input by a teacher.

6. The robot teaching apparatus according to claim 1, wherein the measuring unit measures positions and orientations of the holding unit and the target object in a state where the holding unit is holding the target object.

7. The robot teaching apparatus according to claim 6, wherein the generating unit generates the operation instruction based on the position and orientation of the holding unit with the position of the target object serving as a reference.

8. The robot teaching apparatus according to claim 1, wherein the generating unit uses a maximum holding force among the holding forces as the operation instruction.

9. The robot teaching apparatus according to claim 1, further comprising: an evaluating unit configured to calculate an operation evaluation value of the operation instruction generated by the generating unit.

10. The robot teaching apparatus according to claim 9, wherein the measuring unit measures changes in relative positions and orientations of the holding unit and the target object while the holding unit is holding the target object, and the evaluating unit calculates the operation evaluation value based on the changes in the relative positions and orientations.

11. The robot teaching apparatus according to claim 10, wherein the evaluating unit obtains the operation evaluation value based on the holding force, a rotational moment, or a translational force exerted by the holding unit.

12. The robot teaching apparatus according to claim 9, wherein the evaluating unit obtains the operation evaluation value based on a difference between a holding operation measured by the measuring unit and a mock holding operation reproduced through calculation.

13. The robot teaching apparatus according to claim 1, further comprising: an output unit configured to output the operation instruction to an information processing apparatus connected to the robot teaching apparatus.

14. The robot teaching apparatus according to claim 1, further comprising: the mechanism that acts on the target object.

15. A robot teaching apparatus for teaching an operation of a robot, the robot teaching apparatus comprising:
   a measuring unit configured to measure a force acting on a target object by a mechanism while the mechanism is acting on the target object; and
   a generating unit configured to generate an operation instruction for the robot based on the force measured by the measuring unit,
   wherein the mechanism has a shape or a function corresponding to a hand unit of the robot, and the mechanism has a rotation unit configured to rotate the target object.

16. A control method for a robot teaching apparatus for teaching an operation of a robot, the control method comprising:
   measuring a holding force exerted in a state where a mechanism is holding a target object, the mechanism having a shape or a function corresponding to a hand unit of the robot; and
   generating an operation instruction for the robot based on the measured holding force.

17. A robot system that operates in accordance with a taught operation, the robot system comprising:

a robot teaching apparatus for teaching an operation of a robot, the robot teaching apparatus comprising:
  a measuring unit configured to measure a holding force exerted in a state where a mechanism is holding the target object, the mechanism having a shape or a function corresponding to a hand unit of the robot, and
  a generating unit configured to generate an operation instruction for the robot based on the holding force measured by the measuring unit, and
  a recording unit configured to record the operation instruction; and
a robot unit that operates based on the operation instruction accumulated in the recording unit.

18. A non-transitory computer readable storage medium storing a program for causing a computer to execute a control method for a robot teaching apparatus for teaching an operation of a robot, the control method comprising:
  measuring a holding force exerted in a state where a mechanism is holding the target object, the mechanism having a shape or a function corresponding to a hand unit of the robot;
  generating an operation instruction for the robot based on the measured holding force.

19. A robot teaching apparatus for teaching an operation of a robot, the robot teaching apparatus comprising:
  a mechanism which is provided separately from the robot and has a holding unit configured to hold a target object, the mechanism having a shape or a function corresponding to a hand unit of the robot;
  a measuring unit configured to measure a holding force exerted in a state where the holding unit is holding the target object; and
  a generating unit configured to generate an operation instruction for the robot based on the holding force measured by the measuring unit.

20. A robot teaching apparatus for teaching an operation of a robot, the robot teaching apparatus comprising:
  an imaging unit configured to image the robot teaching apparatus and a target object while a mechanism is acting on the target object, the mechanism having a shape or a function corresponding to a hand unit of the robot;
  a measuring unit configured to measure positions and orientations of the mechanism and the target object while the mechanism is acting on the target object, based on the images obtained by the imaging unit; and
  a generating unit configured to generate an operation instruction for the robot based on the position and orientation of the mechanism with the position and orientation of the target object serving as a reference.

* * * * *